Nov. 18, 1969  E. P. KNAPP  3,478,593
COMPENSATING MEANS FOR SYNCHRO OUTPUT FOR
BAROMETRICALLY ACTUATED SYSTEMS
Filed March 22, 1968  2 Sheets-Sheet 1

INVENTOR
EMIL P. KNAPP
BY Hubbell, Cohen
+ Stiefel

ATTORNEYS.

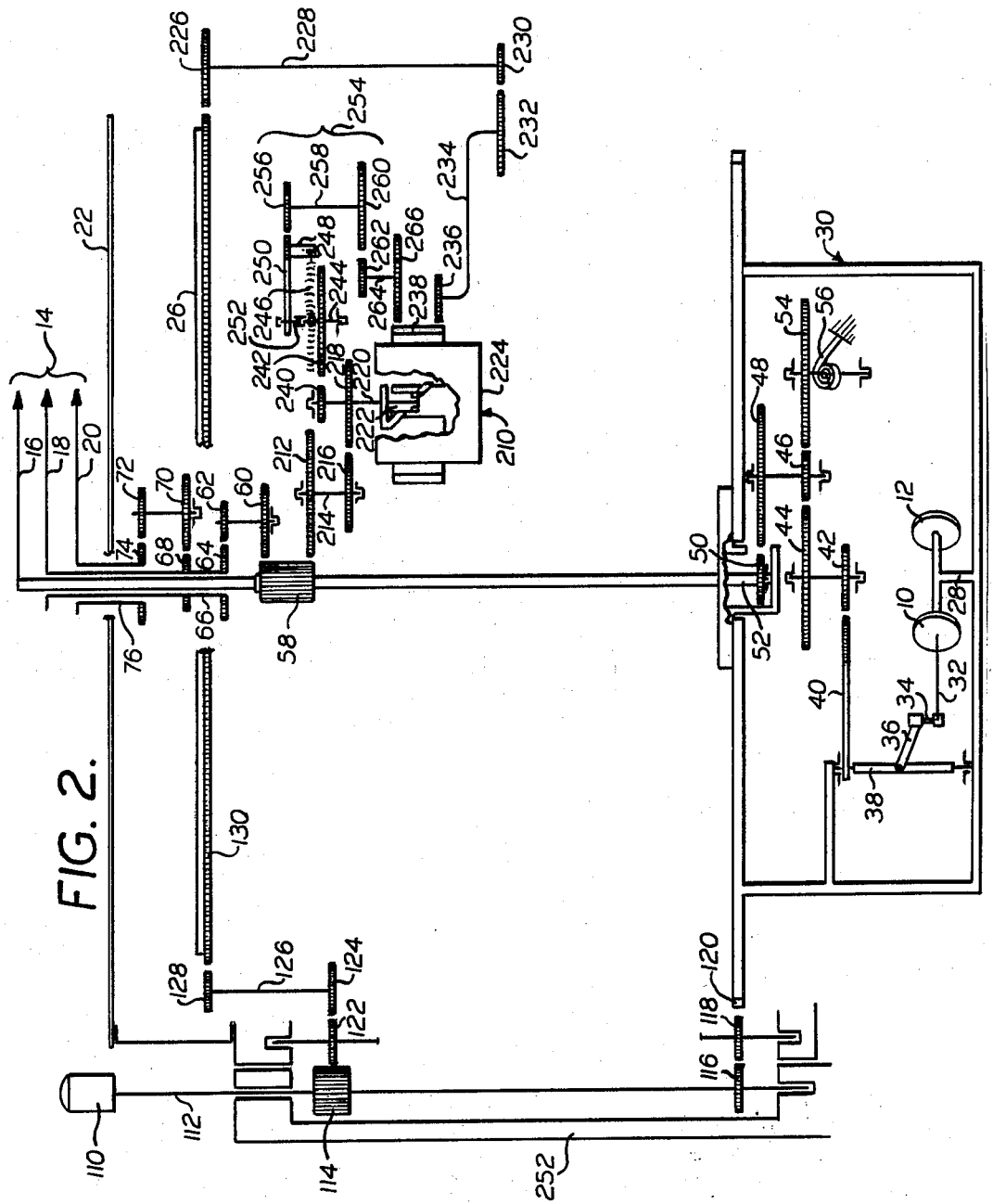

United States Patent Office 3,478,593
Patented Nov. 18, 1969

3,478,593
COMPENSATING MEANS FOR SYNCHRO OUTPUT FOR BAROMETRICALLY ACTUATED SYSTEMS
Emil P. Knapp, New Fairfield, Conn., assignor to Lear Siegler, Inc., Armonk, N.Y., a corporation of Delaware
Filed Mar. 22, 1968, Ser. No. 715,436
Int. Cl. G01l 7/12
U.S. Cl. 73—387                                    12 Claims

ABSTRACT OF THE DISCLOSURE

The inclusion in a pressure actuated altimeter of a novel anti-backlash means for the rotor of a signal generator, e.g., a synchro, driven by the altimeter. The anti-backlash means includes an anti-backlash spring, one end of which is connected to a spindle geared to the rotor shaft and the other end of which is connected to a post. Means are included for moving the post at the same angular speed as the spindle during an adjustment of the barometric setting in order to prevent a change in the torque that the spring applies to the spindle and thus to the rotor, which torque change would affect the output of the synchro.

BACKGROUND OF THE INVENTION

Field of the invention

The present invention relates to an anti-backlash means for the rotor of a synchro in a pressure actuated altimeter, the synchro being driven by the altimeter to produce an electric signal dependent upon altitude, which anti-backlash means is torque independent of barometric adjustment.

Description of the prior art

Altimeters actuated by the expansion and contraction of aneroid capsules are well known, and various signal generating devices have been incorporated therein to provide an altitude-dependent signal for an autopilot, air data computer, ground control device, or the like. See, for example, U.S. Patent No. 3,353,408, issued Nov. 21, 1967, to Frank G. Daleo for Altimeter for Producing Data Referenced to a Predetermined Pressure, and assigned to the assignee hereof.

Conventionally, the movable member or rotor of the signal producing device is connected by a gear train to the pointer shaft of the instrument. An anti-backlash spring is conventionally connected between either the rotor shaft or another shaft in the gear train and a fixed point on the frame of the altimeter. Because the rotor is turned by the gear train driven by the pointer shaft as the barometric setting of the altimeter is adjusted in the conventional manner, as by the manipulation of a knob on the altimeter, the spring becomes tightened or loosened during this adjustment. This change in the torque exerted by the biasing spring on the rotor causes a certain amount of undesirable displacement of the rotor with respect to the stator, whereby to introduce an error into the signal of the synchro, or, as is commonly stated, the synchro loses null.

SUMMARY

The change in biasing torque during adjustment of the altimeter barometric setting is eliminated by placing the post for the biasing spring on a movable member instead of on the fixed frame and by providing means for moving the movable member at the same angular speed as the shaft connected to the spring upon rotation of the barometric adjustment knob to prevent the torque exerted by the spring on the synchro rotor from changing during barometric adjustment.

BRIEF DESCRIPTION OF THE DRAWINGS

FIG. 2 is a diagrammatic plan view of the altimeter of FIG. 1.

DESCRIPTION OF THE PREFERRED EMBODIMENT

Figure 1:
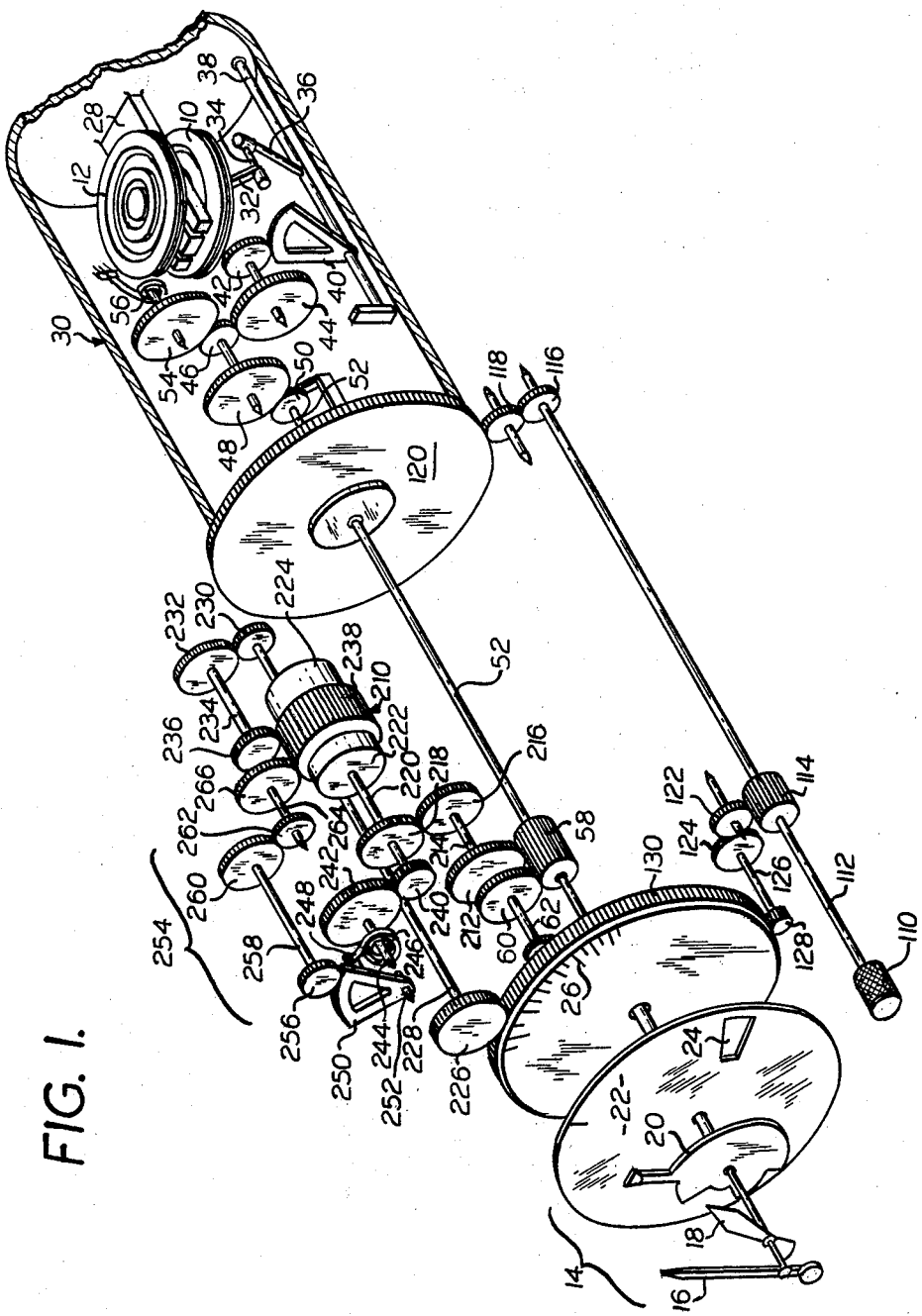
FIG. 1 is a perspective view, partly diagrammatic, of an altimeter in which the present invention is incorporated.

The altimeter of FIGS. 1 and 2, incorporating the present invention, is a conventional barometrically actuated device, having a pair of aneroid capsules 10 and 12 which are connected by a mechanical linkage to a conventional three-pointer display 14, comprising the pointers 16, 18 and 20 which cooperate with a dial 22 bearing appropriate altitude indicia. Dial face 22 is provided with a cutout 24 with which indicia on a barometric dial face 26 may selectively register to display the barometric setting of the instrument. As will be described in detail hereinafter, dial face 26 may be rotated through a barometric adjustment mechanism to alter the display of a barometric indicia through cutout 24 in accordance with the barometric setting.

The capsules 10 and 12 are conventionally mounted on a bracket 28 fixed within a housing 30, which is rotatable for a purpose to be described hereinbelow. The expansion and contraction of the capsules with changes in static pressure, and hence with changes in altitude, is conventionally employed to operate the altitude display 14 as follows.

A link 32 extends from the movable side of the capsule 10 and engages a bimetallic temperature calibration member 34. The calibration member 34 is secured in well-known manner to a rocker arm 36 which extends radially from a rocker shaft 38. A gear sector 40 is fixed to the rocker shaft 38 so as to transmit rotation of the rocker shaft to a gear train comprising the gears 42, 44, 46 and 48. The gear 48 meshes with a central pinion 50 fixed on a pointer shaft 52, which shaft is coaxial with the axis of the rotatable housing 30 to extend through the front of the housing 30 and through the dial face 22 to carry the pointer 16 fixed thereto.

The gear train hereinabove described is also provided with an anti-backlash gear 54 meshing with the gear 46. The anti-backlash gear 54 is resiliently biased by a spiral spring 56 fixed between the gear and the housing 30.

Conventionally, the pointer 16 gives a "fine" indication of the altitude, as in hundreds of feet, while "coarse" indication of altitude is provided by the thousands and ten-thousands pointers 18 and 20 driven through suitable reduction gearing. For example, as shown in FIG. 2, a central gear 58, fixed on the pointer shaft 52, drives a gear train comprising gears 60, 62 and 64, with an overall ratio of ten to one. The gear 64 is fixed to a hollow pointer shaft 66 which is concentric with the pointer shaft 52 and carries the pointer 18 for indicating altitude, as in thousands of feet. Similarly a gear 68 on the hollow pointer shaft 66 drives a gear train comprising the gears 70, 72 and 74 at a ten to one overall ratio. The gear 74 is secured to an outer hollow pointer shaft 76, concentric with shafts 52 and 66, which carries the pointer dial 20 for representing altitude, as in multiples of ten thousand feet.

A barometric adjustment knob 110 is provided for manual adjustment, or setting, of the barometric reading on the barometric dial face 26, e.g., in inches of mercury, at ground level. The conventional barometric adjustment mechanism of the altimeter is as follows. The knob 110, which extends from the front of the altimeter so that it may be manually gripped and rotated by the pilot, is mounted on a shaft 112, which carries thereon the gears 114 and 116. The gear 116 meshes with an idler 118, which meshes with a housing gear 120, which is a large gear fixed to the rotatable housing 30 coaxially therewith. Thus, manual rotation of the knob 110 causes rotation of the housing 30. As the housing 30 is rotated, the pointer shaft 52 is caused to rotate by the gear train hereinabove described. Thus, the pointers 16, 18 and 20 of the pointer display 14 are caused to rotate and thereby to change the altitude reading displayed as the barometric adjustment knob 110 is turned.

The gear 114 on the borometric adjustment knob shaft 112 meshes with an idler 122, which in turn meshes with the gear 124 on a shaft 126. Also fixed on the shaft 126 is a gear 128, which meshes with a barometric dial face gear 130, the front side of which is fixed to (or is marked with) the barometric dial face 26, a portion of which is visible through the cutout 24 in the dial face 22, as mentioned hereinabove. In this manner, the pilot may first obtain the borometer reading at a nearby airport by radio and then rotate the barometric adjustment knob 110 until the corresponding reading on the barometric dial face 26 is registered with and hence displayed through the cutout 24. The three pointer display 14 is moved, as hereinabove described, with the changes in the barometric setting so that the correct altitude over a given location is indicated when the prevailing barometric reading for that particular area is set in the altimeter.

In addition to the visual display of altitude, it is frequently desirable to provide the altimeter with means for producing an electric signal that is a function of altitude. A synchro 210 may be and is commonly utilized to provide the altitude-dependent signal, generally for input to an air data computer. Such a synchro is connected with the hereinabove described, with the changes in the barometric manner.

The central gear 58 is in mesh with a gear 212. It will be recalled that the central gear is fixed on the pointer shaft 52 and also drives the pointer reduction train 60–74. The gear 212 driven by the central gear 58 is fixed on a spindle 214, to which is affixed another gear 216. The gear 216 meshes with a gear 218 fixed on a shaft 220 which carries the rotor 222 of the synchro 210. Thus, rotation of the synchro rotor 222 occurs concomitantly with rotation of the pointer display 14 inasmuch as both are driven by the pointer shaft 52.

If it were desired to produce a signal which was dependent on the altitude displayed by the pointers, so that a null point of the synchro would correspond to an altitude reading of zero, then the stator of the synchro would appropriately be fixed to the frame of the altimeter. Displacement of the rotor with respect to the stator would thus correspond to displacement of the pointer display with respect to the zero point on the fixed dial.

However, it is preferable for the synchro to produce a signal which does not always correspond to that shown by the pointer display 14, because the altitude displayed by the pointers is referenced to and dependent upon the barometric setting on the barometric dial face 26 and thus is altered whenever the pilot rotates the knob 110 to reset the barometric correction, as hereinabove described.

In the case of the synchro, it is preferred to produce an altitude signal referenced to a single, standard barometric reading, e.g., 29.92 inches of mercury at 0° C., which is standard pressure at sea level. This is accomplished by adjusting the altimeter, as during assembly, so that when the barometric dial 26 is set to the standard pressure and at the same time the pointer display 14 is set at zero the synchro 210 in a condition of null; that is, it produces no signal. The setting of null for the standard barometric condition is then maintained in the synchro even though the setting of the barometric dial face 26 is changed whenever the pilot rotates the knob 110. This is accomplished by providing means for rotating stator 224 of synchro 210 to compensate for the changed position of the rotor 222 accompanying the changed position of the three pointer display 14 whenever the barometric dial face 26 is reset, as hereinabove described.

Thus, a gear 226 is provided to mesh with the barometric dial face gear 130 and thus to transmit rotation to a shaft 228 to which it is affixed. A second gear 230 fixed to the shaft 228 meshes with a gear 232, which is joined by a shaft 234 to a gear 236. The gear 236 meshes with a ring gear 238 to the stator 224 of the synchro 210. Thus, rotation of the barometric dial face gear 130 accompanying a barometric adjustment results in an offsetting rotation of the stator 224 compensating for the corresponding rotation of the rotor 222 accompanying the barometric setting change. Thus, even though the barometric setting is changed, and the altitude display is changed, the condition of the synchro 210, i.e., the relative positions of rotor 222 and stator 224, is constant unless an actual change of pressure causes the capsules to expand or contract and thereby operate the pointer display 14 and move the rotor 222 with no compensating change of the position of the barometric dial face 26 and thus no movement of the stator 224.

The means for transmitting rotation to the synchro 210 is incomplete as described hereinabove, inasmuch as the gear trains necessarily have some backlash in them, so that whenever the direction of rotation is reversed, the driving gear travels some angular distance before the driven gears follow, resulting in a loss of the predetermined null setting, the achievement of which has been described hereinabove.

A convenient means for eliminating backlash in the gear train is to rotationally bias one of the shafts with a resilient member. Conventionally such biasing is accomplished by a spiral spring fixed between a gear or its shaft and a relatively fixed point on the frame or housing similar to the assembly described hereinabove with respect to the spring 56 and the gear 54 within the housing 30.

Thus, it would be conventional to provide an additional gear on the rotor shaft, meshing with a gear biased by a spring fixed to the frame of the altimeter.

We have found, however, that such a conventional biasing arrangement also results in a loss of null in the synchro 210. As the pilot changes the barometric setting, and the altitude shown by the display 14 is changed correspondingly, the rotor shaft 220 is rotated by one gear train 212–218 and the stator 224 is rotated by the other gear train 226–238. To maintain the null setting, these two rotations must be angularly equal.

If the spring used to bias the rotor shaft 220 were fixed at one end to the altimeter frame, rotation of the rotor shaft would serve either to wind the spring or to unwind it, thereby increasing or decreasing the biasing torque transmitted back to the rotor shaft.

We have found that it is highly undesirable for the torque exerted by the spring to change whenever the rotor shaft is rotated in response to the readjustment of the barometric setting. In particular, this results in a loss of the null setting of the synchro.

In accordance with the present invention, means is provided for maintaining the biasing torque constant during adjustments in the barometric setting. Specifically, a gear 240 fixed on the rotor shaft 220 meshes with a biasing gear 242 on a spindle 244. Secured to the spindle 244 is the central end of a spiral spring 246, which serves to resiliently bias the spindle 244 and the gear 242 attached thereto. The outer end of the spring 246 rests against and is fixed to a post or anchor tab 248 projecting from a sector gear 250. The sector gear 250 is mounted on a bearing 252, which is concentric with spindle 244, thus permitting the spring 246 to bias the gear train from 242, through 240, 218, 216, 212, 58, 50 to 48.

In normal operation, with the barometric setting fixed, the sector 250 is held in a fixed position with respect to the frame 252 of the altimeter by gearing to be described hereinbelow. However, when the barometric setting is changed, as by manipulation of the knob 110, the sector is caused to rotate with the same angular velocity as the spindle 244, so that the biasing torque exerted on the rotor shaft 220 remains unchanged.

This is preferably accomplished by a gear train 254 which links the sector 250 with the ring gear 238 fixed to the synchro stator 224. More specifically, the gear train 254 comprises a gear 256 in mesh with the sector 250. The gear 256 is fixed on a shaft 258 which also carries a gear 260 fixed thereto. The gear 260 meshes with a gear 262 affixed on shaft 264. A gear 266, also fixed to the shaft 264, meshes with the ring gear 238 of the synchro 210. The spring 246 inherently biases the gear train 254 and thereby train 226–238.

In use, after the barometric setting is properly set, as indicated by the barometric indicia in register with cutout 24, the barometric dial face gear 130 and the housing gear 120 are both stationary. Because the housing gear 120 is stationary, the pointer shaft 52 is rotated only in response to the expansion and contraction of the capsules 10 and 12 with a change in static pressure and hence of altitude. The pointer display 14 shows the changing altitude, indicated by the expansion or contraction of the capsules 10 and 12 as transmitted to the pointer shaft 52 by the linkage and gearing 32–50 described hereinabove. The pointer shaft 52 also rotates the synchro rotor 222 by the gear train 212–220 hereinabove described.

Because the barometric dial face gear 130 remains stationary, the stator 224 of the synchro 210 is held in position by the gear train 226–238 hereinabove described. The ring gear 238 fixed to the stator 224 being immobile, the sector 250 is held in position by the gear train 254. Thus the biasing gear 242 and its spindle 244 are rotationally biased by the tendency of the spring 246 to unwind between the presently stationary sector 250 and the rotatable spindle 244. The slight rotation of the gear 242 fixed to the spindle 244 thereby tends to rotate the gear 240 on the rotor shaft 220, causing the gear 218 to be rotated tightly against the gear 216 so that there is no backlash in the gear train from 218 through 212, 58, 50, to 48, which is driven by the central gear 58 on the pointer shaft 52.

To maintain the setting of null in the synchro 210, it is desirable that the biasing torque exerted by the spring 246 be constant for a given pressure altitude, no matter what the barometric setting may be adjusted to. The following description illustrates the manner in which the present invention accomplishes this result.

As hereinabove described, the spring 246 biases the rotor shaft 220 with a torque of a preselected value. This torque is not altered when the barometric setting is changed, by virtue of the present invention, as follows. When the pilot desires to reset the barometric dial face 26, as when he receives a new reading from a control tower, he manipulates the knob 110 and thereby causes the barometric dial face gear 130 and the housing 30 to rotate simultaneously. Rotation of the housing 30 induces rotation of the pointer shaft 52, as hereinabove noted, with concomitant rotation of the synchro rotor 222.

The rotation of the rotor shaft 220 is transmitted to the spindle 244 and thus tends to change the tension on the spring 246 by either winding or unwinding it. As a result of the present invention, however, the spring 246 is neither wound nor unwound during adjustment of barometric setting but instead remains at the same level of tension because the sector 250 and its spring anchor tab 248 are rotated simultaneously the same angular distance as is spindle 244, rotation of the spindle 244 being a result of and proportional to rotation of synchro rotor shaft 220. This rotation of sector 250 takes place as follows.

When the barometric dial face gear 130 rotates, as hereinabove described, the gear train 226–238 causes the synchro stator 224 to rotate, which rotation matches the rotation of the rotor, as hereinabove described.

Rotation of the synchro ring gear 238 stemming from the adjustment of barometric setting causes the gear train 254 to rotate the sector 250 through precisely the same angular distance as spindle 244 is rotated as a result of the rotation of shaft 52 which also stems from the adjustment of barometric setting. As the two ends of anti-backlash spring 246 are thus maintained in fixed relative angular relationship during the adjustment of barometric setting, there is no change in the torque applied by spring 246 to spindle 244 and, through gears 242–240, to synchro rotor shaft 220. Thus, barometric setting may be changed again and again without loss of null.

It should be noted that the synchro may be set to null at any selected pressure altitude. Thus the datum or reference pressure is not necessarily limited to sea level standard; if desired it could be a preselected cruising altitude. In such a case, the synchro output could be fed to an autopilot, with a change of sensed altitude from null indicating the need to ascend or descend to re-establish the "null altitude." It is apparent that the pilot may need to adjust the barometric setting while the autopilot is in operation. The present improvement would prevent the autopilot from changing the actual altitude of the aircraft to compensate for spurious loss of null resulting from changes in the torque of spring 246 as would occur with conventional instruments.

From the foregoing description, it will be evident to one skilled in the art that although the embodiment illustrated and described is preferred, similar results might be obtained by eliminating the gear train 254 between the stator 224 and the anchor tab 248 abutting the outer end of the spring 246 and substituting instead an appropriate gear train or other connecting means between the barometric dial face gear 130 and the anchor tab 248 or between the housing gear 120 and the anchor tab 248, or between the knob 110 and the anchor tab 248, or, indeed, between any member rotating with the barometric dial face gear 130 and the anchor tab 248.

It should be noted that the present invention is by no means restricted to use in pressure-actuated instruments. Thus, in the illustrated embodiment, a servo motor (not shown) may be mounted on the housing 30 to drive the pointer shaft 52 in response to electrical input from a remote altitude signal source such as a radar altimeter, a ground control device, or the like. Operation of the present invention in such a device under servo motor drive is identical to operation under pressure responsive drive, inasmuch as the pointer shaft 52 and the barometric dial face gear 130 operate in the same manner under both forms of drive.

While the preferred form of the present invention has been shown and described herein and various modifications have been suggested, other changes and modifications may be made therein within the scope of the appended claims without departing from the spirit and scope of this invention.

What is claimed is:

1. In combination, an electrical signal generator comprising first and second relatively rotatable elements, said signal generator generating a signal in accordance with the relative angular position between said first and second element; means including a gear train for rotating said first element relative to said second; anti-backlash means for said gear train including a rotatable spindle, an anchor, and an anti-backlash spring having one end operatively connected to said spindle and the other end connected to said anchor for biasing said spindle in a given direction, whereby to bias the gears in said gear train in given respective direction; adjustment means for simultaneously rotating said second element and through said gear train said first element substantially the same angular distance, whereby to rotate said spindle a given angular distance; and means for connecting said adjustment means to said anti-backlash spring anchor for rotating said anchor substantially the same angular distance as said spindle is rotated upon operation of said adjustment means.

2. The apparatus of claim 1, wherein said last mentioned means comprises a second gear train extending between and connected to said second element of said signal generator and said anti-backlash spring anchor.

3. The apparatus of claim 1, wherein said last mentioned means further comprises a first gear on said spindle, said first gear being rotatable with respect to said spindle and fixed to said anti-backlash spring anchor.

4. The apparatus of claim 3, wherein said last mentioned means comprises a second gear train extending between and connected to said second element of said signal generator and said first gear on said spindle.

5. The apparatus of claim 4, wherein said anti-backlash means further comprises a second gear fixed to said spindle, a third gear in mesh with said second gear, and a second rotatable shaft fixed to said third gear and to said first element of said signal generator.

6. In an altimeter comprising altitude display means; a rotatable shaft operatively connected to said display means for operating same; altitude responsive drive means for rotating said shaft; an electrical signal generator comprising first and second relatively rotatable elements, said signal generator generating a signal in accordance with the relative angular position between said first and second element; means including a gear train extending between and connected to said shaft and said first element for rotating said first element in response to rotation of said shaft; adjustment means for rotating said shaft to adjust said display means, whereby said first element of said signal generator is rotated therewith; means for connecting said adjustment means to said second element of said signal generator for rotating said second element an angular distance equal to that of said first element upon operation of said adjustment means; anti-backlash means for said gear train, said anti-backlash means comprising a rotatable spindle, an anchor, and an anti-backlash spring having one end operatively connected to said spindle and the other end connected to said anchor for biasing said spindle in a given direction, whereby to bias the gears in said gear train in given respective directions; the improvement comprising means for connecting said adjustment means to said anti-backlash spring anchor for rotating said anchor substantially the same angular distance as said spindle is rotated upon operation of said adjustment means.

7. The altimeter of claim 6, wherein said last mentioned means comprises a second gear train extending between and connected to said second element of said signal generator and said anti-backlash spring anchor.

8. The altimeter of claim 7, wherein said second element rotating means comprises a third gear train, whereby said anti-backlash spring biases said anchor in a given direction, thereby additionally to bias the gears in said second and third gear trains in given respective directions.

9. The altimeter of claim 6, wherein said last mentioned means further comprises a first gear on said spindle, said first gear being rotatable with respect to said spindle and fixed to said anti-backlash spring anchor.

10. The altimeter of claim 9, wherein said last mentioned means comprises a second gear train extending between and connected to said second element of said signal generator and said first gear on said spindle.

11. The altimeter of claim 10, wherein said anti-backlash means further comprises a second gear fixed to said spindle, a third gear in mesh with said second gear, and a second rotatable shaft fixed to said third gear and to said first element of said signal generator.

12. The altimeter of claim 6, wherein said signal generator is a synchro.

References Cited

UNITED STATES PATENTS 2,164,601   7/1939   Urfer _____ 73—387
3,353,408   11/1967  Daleo _____ 73—387

LOUIS R. PRINCE, Primary Examiner

DENIS E. CORR, Assistant Examiner

PO-1050
(5/69)

UNITED STATES PATENT OFFICE
CERTIFICATE OF CORRECTION

Patent No. 3,478,593      Dated November 18, 1969

Inventor(s) Emil P. Knapp

It is certified that error appears in the above-identified patent and that said Letters Patent are hereby corrected as shown below:

Column 3, line 10: "borometric" should read -- barometric --; line 12: "121", at end of the line, should read -- 126 --; line 18: "borometer" should read -- barometer --; line 23: "thebarometric" should read -- the barometric --; line 33: delete "with the changes in the barometric" and substitute therefor -- altimeter drive train in the following --; line 66: after "dial" insert -- face --; line 67: after "zero" insert a comma (,). Column 4, line 8: before "to" insert -- fixed --; line 34: after "housing" insert a comma (,).

SIGNED AND SEALED

JUN 3 0 1970

(SEAL)
Attest:

Edward M. Fletcher, Jr.
Attesting Officer

WILLIAM E. SCHUYLER, JR.
Commissioner of Patents